United States Patent [19]

Korpi

[11] Patent Number: 5,058,858

[45] Date of Patent: Oct. 22, 1991

[54] SECURITY DRAIN PLUG FOR ARMOR AND THE LIKE

[75] Inventor: John G. Korpi, Livonia, Mich.

[73] Assignee: The United States of America as represented by the Secretary of the Army, Washington, D.C.

[21] Appl. No.: 637,241

[22] Filed: Jan. 3, 1991

[51] Int. Cl.$^5$ .................. F16K 51/00; F16L 55/11
[52] U.S. Cl. .................. 251/127; 251/144; 138/41; 138/44; 138/89; 138/92
[58] Field of Search .................. 251/127, 144; 137/247.41; 138/41, 44, 89, 92

[56] References Cited

U.S. PATENT DOCUMENTS

| 1,234,251 | 7/1917 | Zorzytzki | 251/127 X |
| 3,086,549 | 4/1963 | Fino | 251/127 X |
| 3,856,049 | 12/1974 | Scull | 251/127 X |

FOREIGN PATENT DOCUMENTS

| 1009637 | 6/1957 | Fed. Rep. of Germany | 251/127 |
| 15914 | of 1905 | United Kingdom | 251/127 |

Primary Examiner—Arnold Rosenthal
Attorney, Agent, or Firm—Peter A. Taucher; Gail S. Soderling

[57] ABSTRACT

A drain plug is disclosed for use with hollow structures which prevents the insertion of an external probe into the structure internal cavity.

3 Claims, 1 Drawing Sheet

SECURITY DRAIN PLUG FOR ARMOR AND THE LIKE

GOVERNMENT INTEREST

The invention described herein may be manufactured, used, and licensed by or for the Government for governmental purposes without payment to me of any royalty thereon.

BACKGROUND OF THE INVENTION

1. Field of the Invention

In one aspect this invention relates to drain plugs useful for structures which are subject to seepage or the accumulation of water or other fluids. In yet a further aspect this invention relates to armor modules having cavities which are subject to the accumulation of water or other liquids.

2. Prior Art

Present armored vehicles contain sealed box-like structures wherein the walls of the structures are formed of an armor material such as armor steel or aluminum alloys. The interior cavity surrounded by the armor plate can contain special armor or special configurations of armor which must be concealed from view and from discovery in order to maintain the confidentiality and classified nature of the interior of the cavity. Such cavities are subject to occasional seepage or condensation of water or other fluids into the enclosures which will accumulate over a period of time with the result and possibility of corrosion other degradation of the interior of the armored cavity. Therefore, it would be desirable to provide means for draining the fluid from the cavities on a periodic basis. However, standard drain plugs which simply screw in or out of the bottom portion of a cavity containing construction will allow fiber optics or other sophisticated photographic and optical intrusive devices to be inserted into the interior cavity revealing the classified structures. Therefore, it would be desirable to provide a drain plug structure with a portion which could be removed from a drain channel at the bottom of the armor material but where the drain channel communicates with the interior of the cavity by means of a complex serpentine or similar labyrinthian type path which would allow fluid in the cavity to drain freely to the outside but prohibit and render and impossible the insertion of optical fibers and other sophisticated optical intrusive devices.

SUMMARY OF THE INVENTION

The drain plug structure according to this invention has a solid body formed of a material compatible with the armor plate into which the drain plug is to be placed and permanently secured such as by means of locking pins or welding. The plug has at least one blind cavity having an open end communicating with the interior of the armor structure to be drained, the cavity opening preferably being covered with a screen or other mesh like material, the cavity having a blind end which terminates short of the surface of the plug. The plug has a second blind cavity having its closed end within the interior of the plug and its open end in the exterior of the armor structure to allow drainage of fluid out of the second cavity into the ambient surroundings. The first blind cavity and the second blind cavity are connected by means of a fluid connecting channel connecting the blind end of the first cavity with the blind end of the second cavity so fluid from the interior of the armored structure can flow into the first cavity, through the fluid connecting channel and into the second cavity which allows the fluid to exit. The interconnection between the first and second cavities is an acute angle as measured between the longitudinal axes of the cavities and the fluid connecting channel, so that a fiber optic inserted into one of the channels has to make an acute angle back upon its direction of travel in order to continue its path along the fluid passage between the exterior of the plug and the interior of the plug. The second blind cavity has a removable device inserted in the open end so that the cavity can be securely closed when desired and the plug is easily removable to allow the drainage of the fluid from the inside of the armor cavity.

DETAILED DESCRIPTION OF PREFERRED EMBODIMENT

Figure 1:
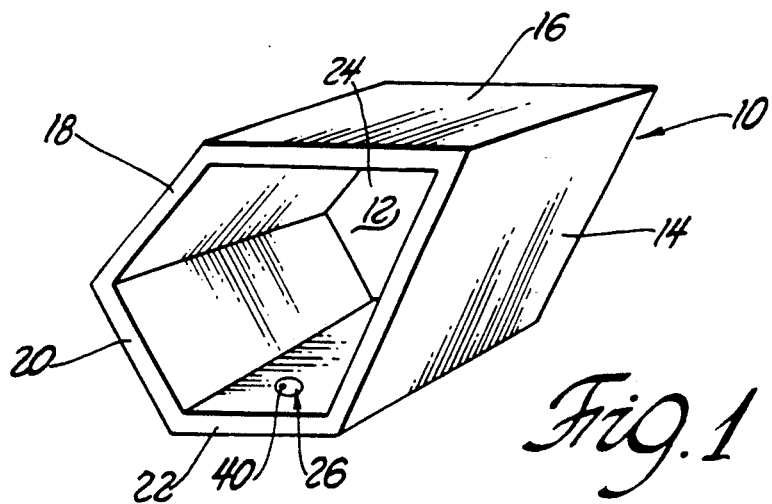
FIG. 1 is a schematic view of an armored cavity having a drain plug of this invention mounted in its lower surface.

Referring to the accompanying drawing in which like numerals refers to like parts throughout the drawings, FIG. 1 is a sectional view of an armored box 10 surrounding a cavity 12 such as might be placed on the front of a tank or other heavy armored vehicle. The box 10 has been constructed out of a plurality of plates 16, 18, 20, 22, and 24. As shown, the box 10 has a slanted back surface formed by plate 14. A top plate 16 and bottom plate 22 are attached to the back plate 14 and extend forward parallel to each other. The top 16 and bottom 22 plates extend to a position forward of the back plate and two front plates 18, 20 extend at an angle from the top and bottom plates to a position forward of the back plate. The two front plates extend towards each other and will be joined at a seam to provide a box with an angled front portion. This is a common armor structure so as to provide incoming projectiles with an oblique contact surface. The five plates 14, 16, 18, 20, 22 and 24 in combination with a second end plate parallel to end plate 24 (not shown) define the cavity 12. Inside the cavity can be placed special armor materials, packings, reactive devices or the like which would be secured from view by the armor. Generally the armor plates would be fabricated using sophisticated welding techniques or casting techniques to provide a single unitary rigid structure when finally completed. As shown, a drain plug 26 according to this invention has been mounted in the bottom plate 22 to allow any liquid collected in the cavity 12 to be drained periodically keeping the interior of the cavity free from liquid.

Figure 2:
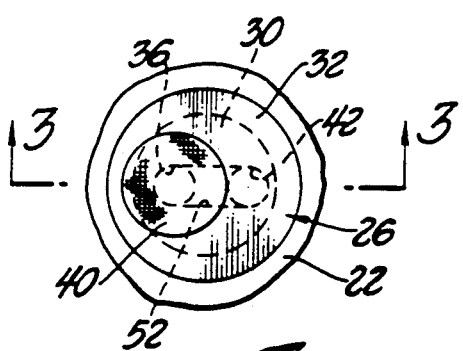
FIG. 2 is a top according of a plug view to this invention.
Figure 3:
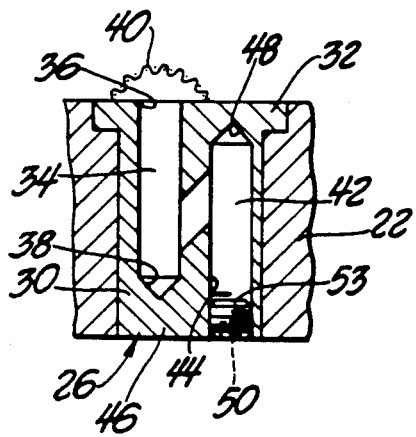
FIG. 3 is a sectional side view of the plug of FIG. 2 taken along the line 3—3.

Turning next to FIGS. 2 and 3 a simple form of the plug, designated 26, according to this invention is shown mounted in a portion of the bottom plate 22. The plug 26 as shown has a body 30 which comprises a relatively uniform diameter section with a flange 32 extending outward from the main body portion. This configuration allows the plug body to be placed in a complimentary aperture formed in the armor plate 22. The plug 26 would be inserted in the bottom plate 22 until the flange 32 had fully seated in a corresponding recess formed in the plate. The plug would then be permanently secured in the armor plate. One means of securing the plug is the use of locking pins or keys. In the case of fabricated sections the plug can be welded directly to the armor plate providing a single internal structure.

The plug has a first blind cavity 34 formed with its opening 36 communicating with the flanged face 32 of the plug, the cavity being blind with its closed and terminating in the body of the plug 30 so that the first cavity 34 is in fluid communication with the interior chamber 12 formed by the armor plates. As shown, a screen or mesh material 40 has been placed over the opening 36 of the first cavity to block the entrance of any item which may have been worked into the first blind cavity from a source outside the armor and also to prevent debris and other materials in the cavity 12 from falling into the cavity and blocking fluid flow. A second blind cavity 42 is shown with its open end 44 in fluid communication with the exterior face 46 of the plug 26 and having its blind end 48 terminating in the body of the plug. The second blind cavity 42 will allow liquid in the cavity 42 to flow freely out of the cavity when a removable stopper 50 is removed. As shown, the second blind cavity 42 has a threaded portion 52 formed on its interior face, the stopper 50 having a corresponding mating threaded portion which can be screwed tightly into the opening 44 to prevent the incursion of fluid into or out of the chamber 12. When the stopper 50 is removed, liquid in the chamber 12 will drain out of the chamber by means of gravity. The first and second blind cavities 34, 42 are connected by a fluid communication channel 52 which runs from a point near the end or terminus 38 of the first cavity 34 to a point near the end or terminus 48 of the second blind cavity 42. The longitudinal axis of the fluid communication channel 52 makes an acute angle with the longitudinal axes of the first and second chambers so that a fiber optic or other intrusion device which is inserted into the second blind channel 42 in an attempt to move towards the interior will have to make a sharp acute angle bend back upon itself in order to follow along the fluid communication channel 52 and should this be accomplished will have to make at least one additional acute angle turn in order to move upwards in the first blind cavity 34 to move towards the interior of the armor. Should both of these acute angles changes be made, which is improbable in most cases, the device would still have to penetrate the mesh material 40 which covers the mouth 36 of the first blind cavity 34.

The two acute angle turns in combination with the screen and the fact that the chambers and fluid communication channel can be made of extremely small diameter would make it difficult for an intrusive device to be inserted into the second chamber and threaded through into the first chamber into the interior of the armor for inspection.

Figure 4:
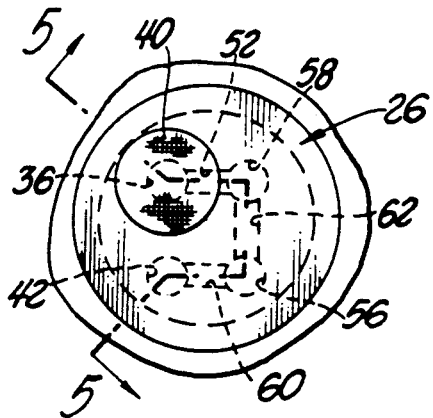
FIG. 4 is a top view of a second embodiment of this invention.
Figure 5:
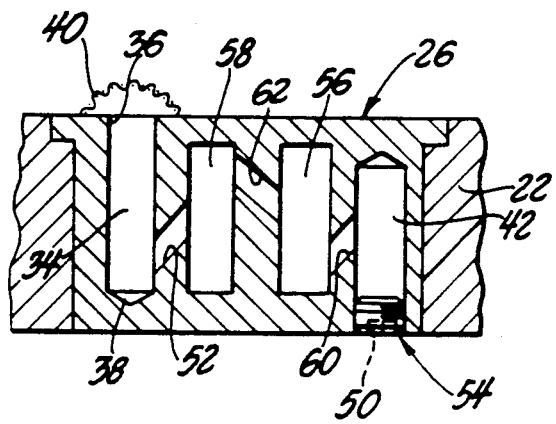
FIG. 5 is a sectional view taken along the line 5—5 of FIG. 4.

FIGS. 4 and 5 disclose a second drain plug 54 according to this invention containing an even more complex labyrinthian construction. In this embodiment, the first cavity 34 formed in the drain plug 54 and the second cavity 42 formed in the drain plug are interconnected by means of two intermediate vertical cavities 56, 58 which results in two additional acute angles which must be traversed by an intrusion device as well as adding right angle turns which must be traversed.

As shown, an intrusion device which would be placed into the second cavity 42 would have to traverse to the top of the cavity and make a acute angle bend back upon itself and make a right angle turn to go into a first fluid communication channel 60 which the device would have to traverse to reach the first intermediate vertical cavity 56 extending vertically downward parallel to the cavity 42. The interior cavity 56 is totally and wholly contained within the body of the plug. An intrusion device entering this first intermediate chamber 56 after traversing along the longitudinal axis for a distance would have to make a second acute angle back upon itself and as shown would also at the same time would have to make a second 90 degree turn to the side in order to follow along the second fluid communication channel 62 connecting the first intermediate chamber with the second intermediate chamber 58. After the intrusion device had traversed the second fluid communication channel 62 it would enter the second intermediate vertical cavity 58 where it would again have to make a turn back upon itself as well as making a third right angle turn to enter cavity 34 where it would have to make its final acute angle turn, at which point the intrusion device would meet the screen 40 described earlier.

The plugs shown can be formed by machining or casting techniques well known in the art and description of the production processes will not be described in the interest of brevity. It is also known to permanently attach such plugs in an aperture formed in a plate structure by means of welding, keys, pins or other fastening devices and it is believed that complete description is not necessary to one skilled in the art and the description of the full manufacturing installation processes are therefore omitted.

I wish it to be understood that I do not desire to be limited to the exact details of construction shown and described for obvious modifications will occur to a person skilled in the art, without departing from the spirit and scope of the appended claims.

What is claimed is:

1. A security drain plug, suitable for use in structures having an enclosed cavity, to allow the drainage of fluid therefrom while preventing the intrusion of an examination device into the interior of the cavity comprising: a plug having a first vertical blind cavity in fluid communication with the interior of the cavity to be drained said first vertical blind cavity having a blind end terminating within the body of the plug; a second vertical blind cavity having its opening extending to the exterior face of said plug to allow passage of fluid from said enclosed cavity to the exterior of the enclosed cavity being drained and having its terminal end within the body of the plug; and a fluid connecting channel connecting the terminal ends of the first and second cavities, said fluid communication channel being disposed at an angle between the blind ends of the first and second cavities such that a device inserted into the second cavity along its longitudinal axis must make an acute bend back upon its direction of travel away from the enclosed cavity with respect to the longitudinal axis of the second cavity in order to traverse the fluid channel and the fluid communication channel being disposed at an angle to the first chamber so that an intrusion device must also make a acute angle to the longitudinal axis of the fluid channel and first blind cavity in order to travel along the longitudinal axis of the first blind cavity.

2. A security drain plug, suitable for use in structures having an enclosed cavity, to allow the drainage of fluid therefrom while preventing the intrusion of an examination device into the interior of the cavity comprising: a plug having a first vertical blind cavity in fluid communication with the interior of the cavity to be drained said first first vertical blind cavity having a blind end terminating within the body of the plug; a second vertical blind cavity having its opening extending to the exterior face of said plug to allow passage of fluid from said second vertical blind cavity to the exterior of the enclosed cavity being drained and having its terminal end within the body of the plug said second vertical blind cavity having its opening being adapted to accept a stopper which can be inserted into the opening to prevent the ingress and egress of fluid from the structure's enclosed cavity when drainage is not desired; and a fluid connecting channel connecting the terminal ends of the first and second vertical blind cavities, said fluid connecting channel being disposed at an angle between the first and second vertical blind cavities such that a device inserted into the second vertical cavity along its vertical longitudinal axis must make an acute bend back upon its direction of travel away from the enclosed cavity with respect to the longitudinal axis of the second cavity in order to traverse the fluid connecting channel and the fluid channel being disposed at an angle to the first chamber so that an intrusion device must also make a acute angle to the longitudinal axis of the fluid channel and first vertical blind cavity in order to travel along the longitudinal axis of the first cavity.

3. A security drain plug suitable for use in structures having an enclosed cavity to allow the drainage of fluid therefrom while preventing the intrusion of an examination device into the interior of the cavity comprising: a plug body having a first vertical blind cavity having an opening extending to the exterior surface of the plug body to allow passage of fluid from the first vertical blind cavity to the ambient surrounding and having a blind end terminating in the body of the plug; a first interior vertical cavity formed within the plug body, the longitudinal axis of the first interior cavity being parallel to the axis of the first vertical blind cavity, a first fluid communication channel connecting the blind end of the first blind cavity with the first interior cavity, the first fluid communication channel being disposed at an angle so that an intrusion device inserted into the first blind cavity must make an acute bend back upon its direction of travel to traverse along the first fluid communication channel away from the enclosed cavity; a second vertical interior cavity formed within the plug body, the longitudinal axis of the second interior cavity being parallel to the axis of the first interior cavity; a second fluid communication channel disposed at an angle to both the first and second interior cavities said second channel being disposed so that a device traversing the first interior cavity must make an acute angle bend back upon its direction of travel to enter the second fluid communication channel and further must make an acute angle bend back from its direction of travel when it exits the second fluid communication channel to enter the second internal cavity; a second blind cavity having an opening in fluid communication with the interior of the structure and having a blind end terminating within the plug body; and a third fluid communication channel connecting the blind end of the second blind channel with the second internal cavity said third fluid communication channel being disposed at an angle to both the second blind cavity and the second internal cavity in such a manner a device traversing the second internal cavity must make an acute angle bend away from the enclosed cavity of the plug body to enter the third fluid communication channel and a device traversing the third fluid communication channel must make an acute angle bend to exit the third fluid communication channel into the second blind cavity.

* * * * *